Nov. 24, 1936.　　　　A. H. HORSEY　　　　2,062,053
TRAILER
Filed Aug. 21, 1935　　　2 Sheets-Sheet 1
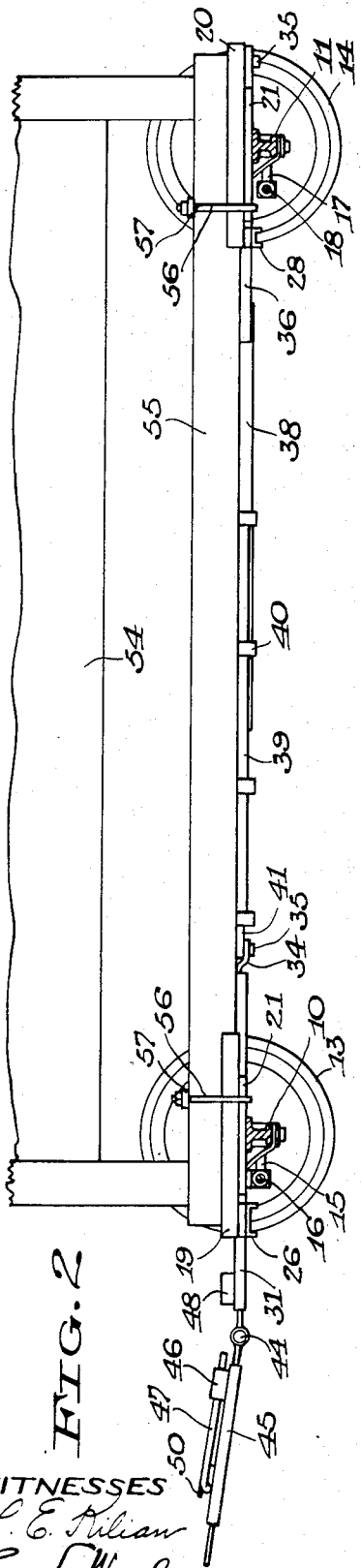
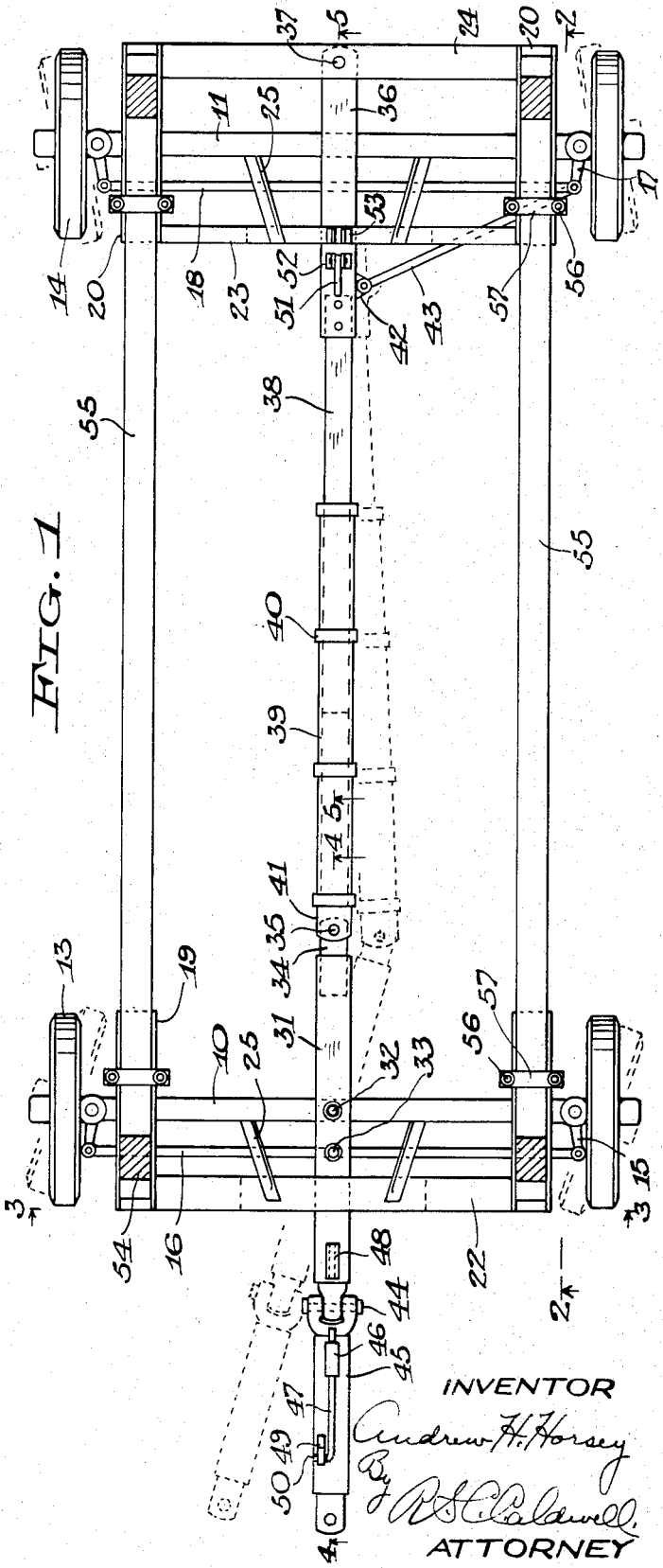
INVENTOR
Andrew H. Horsey
By
ATTORNEY
WITNESSES Nov. 24, 1936.   A. H. HORSEY   2,062,053
TRAILER
Filed Aug. 21, 1935   2 Sheets—Sheet 2
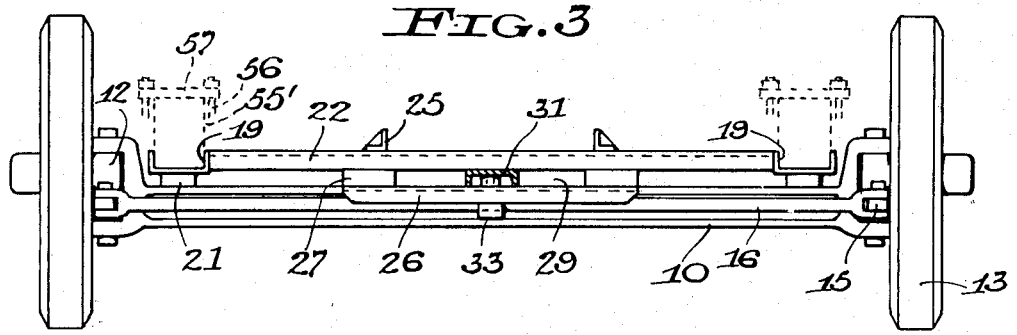
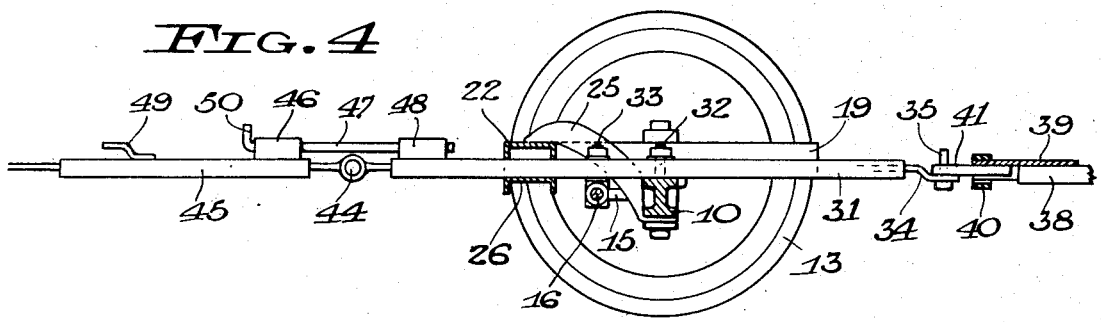
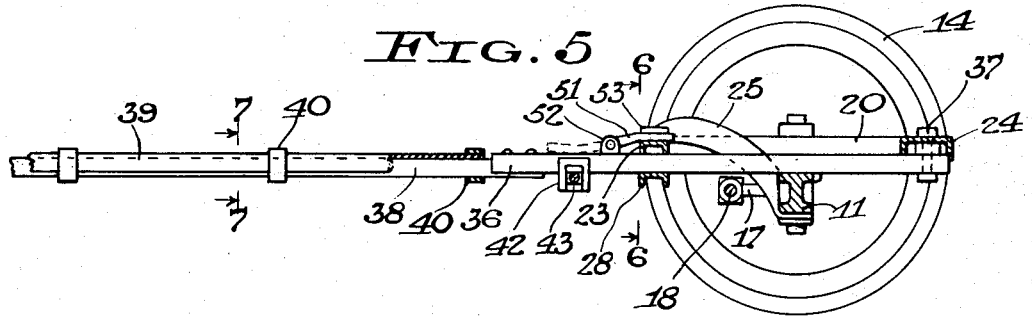
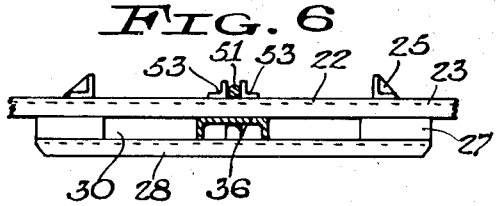
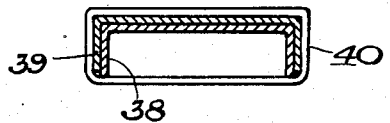
INVENTOR
Andrew H. Horsey
By R. S. Caldwell
ATTORNEY
WITNESSES
L. E. Kilian
C. L. Waal Patented Nov. 24, 1936

2,062,053

UNITED STATES PATENT OFFICE 2,062,053

TRAILER

Andrew Herman Horsey, Mount Vernon, Wash., assignor of one-half to Votja Albert Hamachek, Kewaunee, Wis.

Application August 21, 1935, Serial No. 37,158

4 Claims. (Cl. 280—80)

The invention relates to wheeled vehicles of the trailer type.

An object of the invention is to provide a strong and durable trailer for carrying heavy and bulky loads, and of such construction as to facilitate steering and maneuvering.

Another object of the invention is to provide a trailer adjustable as to wheel base and having simple and reliable means for effecting front and rear wheel steering in various adjustments of wheel base.

The invention further consists in the several features hereinafter described and claimed.

In the accompanying drawings, which illustrate one embodiment of the invention,

Fig. 1 is a top plan view of a trailer constructed in accordance with the invention, parts of a machine carried on the trailer being shown in section, and a turning position of the trailer being shown in dotted lines;

Fig. 2 is a sectional elevation of the trailer taken along the line 2—2 of Fig. 1;

Fig. 3 is a sectional elevation taken along the line 3—3 of Fig. 1, the load being removed;

Fig. 4 is a sectional elevation taken generally along the line 4—4 of Fig. 1, the load being removed;

Fig. 5 is a sectional elevation taken generally along the line 5—5 of Fig. 1, the load being removed;

Fig. 6 is a sectional view taken along the line 6—6 of Fig. 5, and

Fig. 7 is a sectional view taken along the line 7—7 of Fig. 5.

In the drawings, 10 and 11 respectively designate front and rear axle members having pivoted stub axles or spindle bodies 12 on which front wheels 13 and rear wheels 14 are rotatably mounted. The front stub axles are provided with forwardly projecting steering arms 15 connected by a tie rod or link 16, and the rear stub axles are provided with similar steering arms 17 connected by a tie rod or link 18.

The front and rear axle members 10 and 11 carry respective bolster frames which respectively include spaced parallel guide-forming channel bars 19 and 20 extending longitudinally of the trailer adjacent the wheels, the front and rear channel bars at each side being in alignment, and the flanges of the channel bars projecting upwardly to form troughs. The channel bars 19 and 20 are secured to the axle members in any suitable manner, as by a welded connection with interposed reinforcing spacers 21. The front ends of the front channel bars 19 are rigidly connected, as by welding, to a cross channel bar 22, and the front ends of the rear channel bars 20 are similarly connected to a cross bar 23. The rear ends of the rear channel bars 20 are likewise connected by a cross channel bar 24. Diagonally extending braces 25 connect the front and rear axle members with the respective cross bars 22 and 23 and are welded to these bars. Spaced below the front cross bar 21 is a parallel bar 26 (Figs. 3 and 4) secured at its ends, as by welding, to interposed spacers 27, and spaced below the rear cross bar 23 is a parallel bar 28 secured in the same manner, thereby forming respective horizontal guide slots 29 and 30 with the bars 21 and 23.

The front and rear axles are connected by an articulated extensible reach. The front part of the reach is formed by a channel bar 31 which passes through the guide slot 29 and is pivotally secured to the front axle member by a stud 32, the reach bar 31 also having a pivotal connection 33 with the front tie rod or link 16. At its rear end the front reach bar 31 carries a plate or bracket 34 with a pivot stud 35. A channel bar 36 passes through the guide slot 30 at the rear bolster frame and is pivotally secured at its rear end to the cross bar 24 by a pivot bolt 37. The channel bar 36 has rigidly secured thereto a forwardly projecting channel bar 38 which is slidably mounted for telescoping movement in another channel bar 39 having a plurality of spaced surrounding rectangular metal loops or bands 40 which confine the bar 38, the loops being welded to the bar 39. At its front end the channel bar 39 has secured thereto, as by welding, an apertured plate or bracket 41 which has a detachable pivotal engagement with the pin 35 on the swingable front reach bar. Near its front end the rear channel bar 36 has a bracket 42, which is connected by a link 43 to the steering arm 17 of one of the rear wheels.

The front reach bar 31 has a pivotal connection 44 with a draft tongue 45 permitting pivotal movement of the tongue in a vertical plane. On its upper side the tongue carries a tubular guide 46 for a longitudinally extending locking bolt 47 which is adapted to enter a tubular guide 48 secured to the front reach bar 31 and thus lock the tongue against pivotal movement and support it from the front reach bar 31. The locking bolt 47 is normally held in retracted position by a resilient clip 49 secured, as by welding, to the draft tongue 45, the clip being engageable with a bent end 50 of the locking bolt. The guides 46 and 48 are secured in place in any suitable manner, as by welding.

Under certain conditions, as hereinafter described, it is desirable to prevent pivotal movement of the rear stub axles, and this is accomplished by a locking bolt 51 which is pivoted on a bracket 52 secured to the rear reach bar 36, and is swingable to a locking position, as seen in Figs. 5 and 6, between clip angles 53 secured, as by welding, to the cross bar 23 of the rear bolster frame.

The trough-forming channel bars 19 and 20 of the front and rear bolster frames constitute supports- or seats for stringers or beams which connect and are secured to these frames, the beams fitting in the trough-forming channel bars and being engageable with the sides or flanges of the trough-forming channel bars so as to align the front and rear bolster frames to prevent relative lateral shifting of the beams. In the present instance, the trailer is adapted for the transportation of a large machine, more particularly a pea viner 54, the frame of which includes parallel horizontal beams or timbers 55. When the trailer is used for hauling the pea viner, the beams 55 form the connecting beams for the bolster frames and are detachably secured in the channel bars 19 and 20 by U-bolts 56 and clamping bars 57. When the trailer is used without the pea viner, the bolster frames are connected by beams or timbers 55' shown in dotted lines in Fig. 3, these timbers replacing the beams or timbers 55 of the pea viner.

When a pea viner is to be loaded onto the trailer, the viner is jacked up and the trailer is introduced under the viner to register the trough-forming channel bars 19 and 20 with the ends of the beams 55. For this placement, the front section of the trailer is preferably separated from the rear section by disconnecting the front reach bar 31 from the rear reach bars 39 at the pivot pin 35, thereby permitting the trailer sections to be wheeled under opposite ends of the viner. To further facilitate the handling of the trailer sections the draft tongue 45 may be locked to the front reach bar 31 by engaging the locking bolt 47 in the tubular guide 48, and the rear reach bar 36 may be locked against relative swinging movement with respect to the rear bolster frame by engaging the locking bolt 51 between the clip angles 53.

After the front and rear parts of the trailer are properly placed, the pea viner is lowered onto the bolster frames and the beams or timbers 55 of the viner are firmly clamped to the channel bars 19 and 20 by the U-bolts 56 and clamping bars 57. The reach bars are reconnected at the pivot pin 35, and the locking bolts 47 and 51 are released. The swingable draft tongue 45 is then attached to a motor truck or other draft means to transport the pea viner to the desired location. When a turn is being made the front reach bar 31 swings to an angular position, such as indicated by dotted lines in Fig. 1, causing the front wheels 13 to turn in the same direction by the tie rod 16 pivotally connected to this reach bar. The rear end of the front reach bar swings the telescoping rear reach bar in the opposite direction, causing the rear wheels 14 to turn in the same direction as the rear reach bar by means of the tie rod 18 and link 43, thereby permitting short turns to be made. If desired, the steering linkage may be so arranged that the rear wheels will substantially track with the front wheels. The front and rear axle members 10 and 11 are held in parallel relation by the beams 55.

At the destination, such as a field in which the pea viner is to operate, the trailer is maneuvered into the desired position and the U-bolts 56 are released. The pea viner is jacked up, the trailer reach is separated at the pivot pin 35, and the separated trailer sections are then wheeled in opposite directions from under the ends of the pea viner without disturbing the jacks, the viner being thereafter lowered to the desired elevation.

When a battery of pea viners are operated in a field, they are usually placed in definite parallel positions so as to be capable of connection by a driving belt. This requires careful maneuvering of the trailer when placing the second and subsequent viners, and such maneuvering is generally facilitated by disconnecting the reach sections at the pivot pin 35 so that the front and rear wheels of the loaded trailer may be swung independently.

After the trailer sections are removed from under the viner, they are reconnected by beams 55' (shown in dotted lines in Fig. 3) similar to the viner beams 55. The beams 55' are clamped to the front and rear bolsters by the U-bolts 56 and clamping bars 57, the wheel base of the trailer being preferably shortened. The front and rear reach sections are connected by the pivot pin 35, the telescoping reach bar 39 being moved rearwardly on the reach bar 38, as seen in Fig. 5. With the wheel base shortened, it is usually unnecessary to provide rear wheel steering. To prevent rear wheel steering, the locking bolt 51 is swung to locking position between the clip angles 53 on the rear bolster frame. In this case, the pin 35 may be removed to facilitate steering of the front wheels.

While the trailer is particularly adapted for the transportation of pea viners and the like, it is also capable of use with other loads.

What I claim as new and desire to secure by Letters Patent is:

1. In a vehicle, the combination of a front frame having dirigible wheels, a rear frame having wheels, each frame having laterally spaced, upwardly opening beam-receiving troughs rigid thereon and extending longitudinally of the vehicle, beams fitting and resting in said troughs and detachably secured thereon to join said front and rear frames and to hold said frames against relative movement, and draft means for the vehicle having a steering connection with the front wheels, said frame-joining beams being insertable into said troughs from above and being engageable with the opposite sides of said troughs to align said front and rear wheeled frames.

2. In a vehicle, the combination of front and rear frames each having dirigible wheels, front and rear reach members pivotally secured to said respective frames and having a pivoted and detachable connection, steering linkage connecting said respective reach members with said front and rear wheels, and means for detachably connecting and spacing said frames, whereby said wheeled frames may be separately introduced under a load to be carried by the vehicle.

3. In a vehicle, the combination of front and rear wheeled frames adapted to support a load member thereon, each frame having dirigible wheels, means for detachably securing the load member to said frames to connect said frames, front and rear reach members pivotally secured to said respective frames, each reach member having a detachable pivotal connection with the other, steering connections between said front reach member and the front wheels, and steering connections between said rear reach member and the rear wheels, said reach members when detached at their pivotal connection being swingable independently to effect independent steering of the front and rear wheels.

4. In a vehicle, the combination, with a load member having longitudinally extending beams, of a front frame having dirigible wheels, a rear frame having wheels, each frame having beam-receiving guides rigid therewith and extending longitudinally of the vehicle, said beams resting on and interfitting with said guides, means for detachably securing said beams to said guides to join said front and rear frames and to hold said frames against relative movement, and draft means for the vehicle thus formed having a steering connection with the front wheels, said beams being movable onto said guides from above and interfitting with said guides so as to align said front and rear wheeled frames.

ANDREW HERMAN HORSEY.